(12) United States Patent
Zhang et al.

(10) Patent No.: US 11,680,706 B2
(45) Date of Patent: Jun. 20, 2023

(54) COMBUSTION PROCESS OF GLASS KILN WITH NON-CATALYTIC REFORMERS

(71) Applicant: Shanghai Yuanhan Energy & Chemical Technology Co., Ltd., Shanghai (CN)

(72) Inventors: Yunfeng Zhang, Shanghai (CN); Xiangquan Zhang, Shanghai (CN); Qing Liu, Shanghai (CN); Wenjun Wu, Shanghai (CN)

(73) Assignee: Shanghai Yuanhan Energy & Chemical Technology Co., Ltd., Shanghai (CN)

( * ) Notice: Subject to any disclaimer, the term of this patent is extended or adjusted under 35 U.S.C. 154(b) by 0 days.

(21) Appl. No.: 17/888,520

(22) Filed: Aug. 16, 2022

(65) Prior Publication Data

US 2023/0035248 A1 Feb. 2, 2023

Related U.S. Application Data

(63) Continuation of application No. PCT/CN2022/086437, filed on Apr. 12, 2022.

(30) Foreign Application Priority Data

Aug. 2, 2021 (CN) .......................... 202110879116.7

(51) Int. Cl.
 *F23J 15/02* (2006.01)
 *F23C 9/06* (2006.01)

(52) U.S. Cl.
 CPC .............. *F23J 15/022* (2013.01); *F23C 9/06* (2013.01); *F23C 2202/30* (2013.01);
 (Continued)

(58) Field of Classification Search
 None
 See application file for complete search history.

(56) References Cited

FOREIGN PATENT DOCUMENTS

| CN | 1098072 A | 2/1995 |
|----|-----------|--------|
| CN | 101337762 A | 1/2009 |

(Continued)

OTHER PUBLICATIONS

International Search Report of PCT Patent Application No. PCT/CN2022/086437 dated Jul. 6, 2022.

(Continued)

*Primary Examiner* — Jason Lau

(57) ABSTRACT

Disclosed is a combustion process of a glass kiln with non-catalytic reformers. A corresponding system includes the glass kiln, the non-catalytic reformers A/B, a flue gas recovery device, a chimney, a high-temperature flue gas fan, a natural gas supply device, and an oxygen supply device. The present disclosure circulates part of flue gas of the glass kiln and increases concentrations of vapor and carbon dioxide in the circulating flue gas, the vapor and the carbon dioxide in the circulating flue gas are subjected to a conversion and reforming reaction with natural gas in the non-catalytic reformers for recycling sensible heat of the high-temperature flue gas and meanwhile generating high-calorific-value water gas at 1300° C. or above, thereby increasing a gross calorific value and a temperature of gas entering the glass kiln, and the high-calorific-value water gas, less unreacted natural gas, and oxygen are sufficiently combusted in the glass kiln.

9 Claims, 4 Drawing Sheets

(52) U.S. Cl.
CPC ............... *F23C 2900/03002* (2013.01); *F23C 2900/09002* (2013.01); *F23C 2900/9901* (2013.01); *F23J 2215/20* (2013.01); *F23J 2215/50* (2013.01)

(56) References Cited

FOREIGN PATENT DOCUMENTS

| | | |
|---|---|---|
| CN | 107543422 A | 1/2018 |
| CN | 113429114 A | 9/2021 |
| CN | 215403786 U | 1/2022 |
| EP | 2182283 A2 | 5/2010 |

OTHER PUBLICATIONS

Written Opinion of the International Searching Authority of PCT Patent Application No. PCT/CN2022/086437 dated Jul. 6, 2022.

COMBUSTION PROCESS OF GLASS KILN WITH NON-CATALYTIC REFORMERS

CROSS-REFERENCE TO RELATED APPLICATIONS

The present application is a continuation application of PCT application No. PCT/CN2022/086437 filed on Apr. 12, 2022, which claims the benefit of Chinese Patent Application No. 202110879116.7 filed on Aug. 2, 2021, each of which is incorporated by reference herein in its entirety.

TECHNICAL FIELD

The present disclosure relates to the technical field of combustion of glass kilns, and in particular to a combustion process of a glass kiln with non-catalytic reformers.

BACKGROUND

As global warming touches on various aspects such as ecological security, water resources security and food security, it increases the risk of extreme climate disasters and seriously threatens the living environment of human beings. Greenhouse gas emissions are the most important factor causing global warming. The greenhouse effect produced by carbon dioxide accounts for 70% or more that produced by all greenhouse gases. Therefore, the reduction of carbon dioxide emissions is an urgent problem to be solved and is crucial for controlling the greenhouse effect and slowing down the global warming.

Unbalanced supply of global energy and aggravation of geographical crisis cause constant rise of fuel price, increasingly higher glass production cost and meanwhile higher and higher requirements for manufacturing enterprises in energy conservation and emission reduction. An existing combustion system is analyzed and studied, which adopts air for combustion supporting and enables nitrogen to be unnecessarily heated and emitted into atmosphere at a high temperature, thereby causing loss of abundant heat. In addition, the nitrogen reacts with oxygen at the high temperature to produce $NO_x$, and emitting $NO_x$ gas into the atmosphere is extremely likely to form acid rain and then cause environmental pollution.

The present disclosure changes end treatment into source treatment, thereby reducing emission of carbon dioxide and fundamentally realizing breakthrough of ultra-low emission of nitric oxide.

SUMMARY

The present disclosure aims to provide a combustion process of a glass kiln with non-catalytic reformers so as to overcome defects in the prior art.

The present disclosure uses the following technical solutions:

According to the combustion process of a glass kiln with non-catalytic reformers, a system needed during combustion includes the glass kiln, a non-catalytic reformer A, a non-catalytic reformer B, a flue gas recovery device, a chimney, a high-temperature flue gas fan, a natural gas supply device, and an oxygen supply device;

the non-catalytic reformer A and the non-catalytic reformer B are arranged on two sides of the glass kiln and communicate with the glass kiln; the non-catalytic reformer A and the non-catalytic reformer B are in switching connection to an inlet of the flue gas recovery device, an outlet of the flue gas recovery device is connected to the chimney and the high-temperature flue gas fan separately, and the high-temperature flue gas fan is in switching connection to bottoms of the non-catalytic reformer A and the non-catalytic reformer B;

the natural gas supply device is in switching connection to the bottom of the non-catalytic reformer A, an upper portion of the non-catalytic reformer A, the bottom of the non-catalytic reformer B, an upper portion of the non-catalytic reformer B and the glass kiln, and the oxygen supply device is connected to the glass kiln;

pipelines which communicate the high-temperature flue gas fan with the bottoms of the non-catalytic reformer A and the non-catalytic reformer B are each provided with an oxygen content analysis meter, a flow meter, a temperature sensor, and a pressure sensor, pipelines which communicate the natural gas supply device with the bottom of the non-catalytic reformer A, the upper portion of the non-catalytic reformer A, the bottom of the non-catalytic reformer B, the upper portion of the non-catalytic reformer B, and the glass kiln are each provided with a flow regulating valve and a pressure sensor, and a pipeline which communicates the oxygen supply device with the glass kiln is provided with a flow regulating valve and a pressure sensor;

during combustion, the process includes the following steps:

1) at an initial stage, utilizing air for combustion supporting; after flue gas is generated, mixing circulating flue gas and oxygen to serve as a combustion improver to gradually replace the air for combustion supporting; and after a period of time of circulation, the circulating flue gas being rich in vapor and carbon dioxide, completely replacing the air with the circulating flue gas and the oxygen for combustion supporting, and enabling the system to enter a normal running state;

2) at a conversion and reforming stage: when the oxygen content in the circulating flue gas is less than or equal to a set content limiting value, enabling the circulating flue gas to enter the non-catalytic reformer A from the bottom of the reformer, enabling natural gas to also enter the non-catalytic reformer A from the bottom of the reformer, enabling the natural gas and the vapor and the carbon dioxide in the circulating flue gas to be subjected to a conversion and reforming reaction to produce hydrogen and carbon monoxide, namely high-calorific-value water gas, delivering the high-calorific-value water gas into the glass kiln, delivering the oxygen into the glass kiln, and enabling the oxygen, the carbon monoxide and the hydrogen produced by non-catalytic conversion, and less natural gas not subjected to the conversion and reforming reaction to be subjected to a combustion reaction in the glass kiln; and when the oxygen content in the circulating flue gas is greater than the set content limiting value, enabling the circulating flue gas to enter the non-catalytic reformer A from the bottom of the reformer, enabling the natural gas to enter the non-catalytic reformer A from the upper portion of the reformer, enabling the natural gas and the vapor and the carbon dioxide in the circulating flue gas to be subjected to the conversion and reforming reaction to produce hydrogen and carbon monoxide, namely high-calorific-value water gas, delivering the high-calorific-value water gas into the glass kiln, delivering the oxygen into the glass kiln, and enabling the oxygen, the carbon monoxide and the hydrogen produced by non-catalytic conversion, and less natural gas not subjected to the conversion and reforming reaction to be subjected to a combustion reaction in the glass kiln;

3) at a flue gas purging stage: after the conversion and reforming stage ends, switching the natural gas to directly enter the glass kiln, enabling the circulating flue gas to enter the non-catalytic reformer A from the bottom of the reformer to purge, displace, and convert residual combustible gas to enter the glass kiln, and delivering the oxygen into the glass kiln to be subjected to the combustion reaction;

4) at a reformer temperature rise stage: at the conversion and reforming stage and the flue gas purging stage, enabling high-temperature flue gas at an outlet of the glass kiln to enter the non-catalytic reformer B to achieve temperature rise and heat storage inside the reformer and then enter the flue gas recovery device for heat recovery and dust and sulfur removal, then pressurizing part of the flue gas by the high-temperature flue gas fan to be led into the non-catalytic reformer A to be circulated, and emptying the rest by the chimney or enabling the rest to be subjected to carbon capture, utilization, and storage (CCUS); and 5) after a period of time, switching the non-catalytic reformers A/B, namely, enabling the non-catalytic reformer B to be subjected to the conversion and reforming reaction, achieving temperature rise and heat storage in the non-catalytic reformer A; and cyclically performing switchover.

Furthermore, the oxygen supply device produces oxygen with greater than or equal to 90% purity and a pressure of 0.05-0.2 MPa, wherein the oxygen is produced through a method comprising a cryogenic method or a pressure swing adsorption method for oxygen production.

Furthermore, in step 1): at the initial stage, the air is utilized for combustion supporting, the air enters the glass kiln from the non-catalytic reformer A, the natural gas directly enters the glass kiln, the air and the natural gas are combusted in the glass kiln, flue gas generated during combustion passes through the non-catalytic reformer B to heat up and store heat for the non-catalytic reformer B, then enters the flue gas recovery device for heat recovery and dust and sulfur removal, then is led into the non-catalytic reformer A by the high-temperature flue gas fan and then enters the glass kiln, meanwhile, the oxygen is led into the glass kiln, and the circulating flue gas and the oxygen are mixed for combustion supporting, gradually replacing air combustion supporting; after a period of time, the non-catalytic reformers A/B are switched to make the air enter the glass kiln from the non-catalytic reformer B, the natural gas directly enters the glass kiln, the air and the natural gas are combusted in the glass kiln, flue gas generated during combustion passes through the non-catalytic reformer A to heat up and store heat for the non-catalytic reformer A, then enters the flue gas recovery device for heat recovery and dust and sulfur removal, then is led into the non-catalytic reformer B by the high-temperature flue gas fan and then enters the glass kiln, meanwhile, the oxygen is led into the glass kiln, and the circulating flue gas and the oxygen are mixed for combustion supporting, gradually replacing air combustion supporting; switchover is cyclically performed; and after a period of time of circulation, the circulating flue gas is rich in vapor and carbon dioxide, the circulating flue gas and the oxygen completely replace the air for combustion supporting, and the system enters a normal running state.

Furthermore, in steps 2)-5), the non-catalytic reformers A/B are switched every 20 min, the conversion and reforming stage occurs at 0-17 min, the flue gas purging stage occurs at 18-20 min, and the reformer temperature rise stage occurs at 0-20 min.

Furthermore, in step 2), a content limiting value of the oxygen in the circulating flue gas is set to be 2%.

Furthermore, in step 2), when the oxygen content in the circulating flue gas is greater than the set content limiting value, the natural gas enters the non-catalytic reformer A from the upper portion of the reformer, namely, $\frac{1}{5}$-$\frac{1}{3}$ away from the top of the non-catalytic reformer A.

Furthermore, in step 2), step 3) and step 5), the oxygen is delivered into the glass kiln by an oxygen spray gun.

Furthermore, in step 4), the circulating flue gas generated after heat recovery and dust and sulfur removal is pressurized to 0.05-0.2 MPa by the high-temperature flue gas fan and then is led into the non-catalytic reformer A to be circulated.

Furthermore, the system needed during combustion further includes an intelligent control system for controlling a kiln temperature and a kiln pressure of the glass kiln. The intelligent control system includes units for i) controlling switchover of the non-catalytic reformers A/B, ii) controlling switchover of inflow of the natural gas into the non-catalytic reformers A/B and the glass kiln, iii) regulating flow of the oxygen into the glass kiln, iv) regulating flow of the circulating flue gas into the non-catalytic reformers A/B, and/or v) regulating flow of the natural gas into the non-catalytic reformers A/B and the glass kiln.

Furthermore, the circulating flue gas is utilized for isolating and replacing a raw material feeding system during combustion, the circulating flue gas is utilized for isolating parts of the glass kiln prone to air leakage, the parts of the glass kiln prone to air leakage include a glass kiln feeding port, a flame viewing port and a flue, and an isolation manner includes air seal and an air curtain.

Beneficial Effects:

1. The present disclosure circulates part of the flue gas of the glass kiln and increases concentrations of the vapor and the carbon dioxide in the circulating flue gas. The vapor and the carbon dioxide in the circulating flue gas are subjected to the conversion and reforming reaction with the natural gas in the non-catalytic reformers. Endothermic reaction of natural gas conversion and reforming is utilized for recovering sensible heat of the high-temperature flue gas and meanwhile generating the high-calorific-value water gas (the carbon dioxide and the hydrogen) at 1300° C. or above, thereby increasing a gross calorific value and a temperature of gas entering the glass kiln. The high-calorific-value water gas, less natural gas not subjected to the conversion and reforming reaction and the oxygen are sufficiently combusted in the glass kiln so as to reduce fuel consumption and improve heat recovery efficiency. The present disclosure has excellent performance in output increasing, energy conservation and emission reduction and can reduce heat consumption, unit consumption and comprehensive energy consumption, increase yield, reduce flue gas emission load, and achieve ultra-low emission of $NO_x$.

2. The present disclosure utilizes the circulating flue gas and the oxygen to replace the air for combustion supporting, thereby greatly reducing generation of $NO_x$, reducing environment pollution and greatly reducing denitration cost.

3. According to characteristics of gas radiation, only triatomic gas and polyatomic gas have radiation capacity while diatomic gas hardly has it. The higher the proportion for which nitrogen without the radiation capacity accounts, the lower the emissivity of kiln gas becomes, and consequently radiation ability of kiln gas on glass melt is influenced. The content of $N_2$ is greatly reduced by replacing the air with the circulating flue gas and the oxygen for combustion supporting. Adopting flue gas circulation increases the concentrations of the vapor and the carbon dioxide in the kiln. Meanwhile, producing the hydrogen and the carbon monoxide by non-catalytic conversion greatly improves emissivity of the kiln gas and radiation ability for a batch and the glass melt, increases flame temperature, reduces emissivity of emitted flue gas, increases combustion speed, shortens melting time, promotes complete combustion and increases a melting rate.

4. The present disclosure is provided with the non-catalytic reformer A and the non-catalytic reformer B. When the non-catalytic reformer A is used for the conversion and reforming reaction, the non-catalytic reformer B is subjected to temperature rise and heat storage through the high-temperature flue gas at the outlet of the glass kiln to provide heat for the next-time conversion and reforming reaction. When the non-catalytic reformer B is used for the conversion and reforming reaction, the non-catalytic reformer A is subjected to temperature rise and heat storage through the high-temperature flue gas at the outlet of the glass kiln to provide heat for the next-time conversion and reforming reaction. The non-catalytic reformer A and the non-catalytic reformer B are circularly switched, thereby increasing a heat utilization rate and improving work efficiency.

5. After the system of the present disclosure enters the normal running state, three stages including the conversion and reforming stage, the flue gas purging stage and the reformer temperature rise stage are included. At the conversion and reforming stage, the vapor and the carbon dioxide in the circulating flue gas are utilized as raw materials to be subjected to the conversion and reforming reaction with the natural gas in the non-catalytic reformers to produce the carbon monoxide and the hydrogen, thereby increasing a calorific value of fuel and improving heat recovery efficiency. At the flue gas purging stage, residual combustible gas in the reformers is recycled at the conversion and reforming stage to firstly reduce fuel waste and secondly to avoid environment pollution and safety risks caused by emission of most of flue gas containing the combustible gas into the atmosphere at the reformer temperature rise stage. At the reformer temperature rise stage, flue gas circulation is achieved, and the high-temperature flue gas at the outlet of the glass kiln is utilized for temperature rise and heat storage for the non-catalytic reformers so as to provide heat for the next-time conversion and reforming reaction.

6. At the conversion and reforming stage, a manner of inflow of the natural gas into the non-catalytic reformers is adjusted according to different oxygen contents in the circulating flue gas. When the oxygen content in the circulating flue gas is less than or equal to the set content limiting value, the natural gas enters the non-catalytic reformer A from the bottom of the reformer, and the conversion and reforming reaction is sufficiently performed. When the oxygen content in the circulating flue gas is greater than the set content limiting value, the natural gas enters the non-catalytic reformer A from the upper portion of the reformer, the conversion and reforming reaction time is shortened, raw material waste caused by the combustion reaction (only heat is provided) is reduced as much as possible, and safety is high.

7. In the present disclosure, during combustion, the circulating flue gas is utilized for isolating and replacing the raw material feeding system. The circulating flue gas is utilized for isolating the parts of the glass kiln prone to air leakage, including the glass kiln feeding port, the flame viewing port, the flue and the like through air seal or an air curtain or other manners, thereby reducing heat loss through radiation and air inflow, avoiding generation of the nitric oxide, reducing the circulation volume of the flue gas and effectively saving energy and reducing emission.

8. Optimizing a combustion environment enables temperature distribution in the reformers to be more reasonable and effectively prolongs the service life of the kiln and a boiler. Improving a combustion condition in a glass industry also shortens the temperature rise time of the kiln, increases the output, reduces the defective percentage and increases the yield.

9. The combustion process of the present disclosure can increase the emissivity of flames and the combustion speed, increase the flame temperature, sufficiently burn out unburned combustibles carried by the flue gas and reduce the emissivity of exhausted flue gas. Combustible harmful gases decomposed and formed by combustion are sufficiently combusted, thereby reducing generation of harmful gases. The flue gas exhaust temperature and volume are obviously reduced. Thermal pollution and dust discharge are reduced.

10. The recirculation of the flue gas increases the concentration of carbon dioxide, which makes the carbon dioxide capture easier and creates favorable conditions for low-cost CCUS (carbon capture, utilization and storage).

DETAILED DESCRIPTION

The present disclosure is further explained in combination with examples and drawings as below. The following examples are merely used for explaining the present disclosure but not for limiting an implementing scope of the present disclosure.

A conventional air combustion supporting mechanism is as follows:

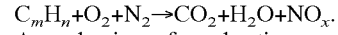
$C_mH_n+O_2+N_2 \rightarrow CO_2+H_2O+NO_x$.

A mechanism of combustion supporting through carbon-based enriched oxygen ($H_2O+CO_2+O_2$) and conversion and reforming reaction of natural gas and circulating flue gas rich in vapor and carbon dioxide in the present disclosure is as follows:

combustion reaction

Figure 1:
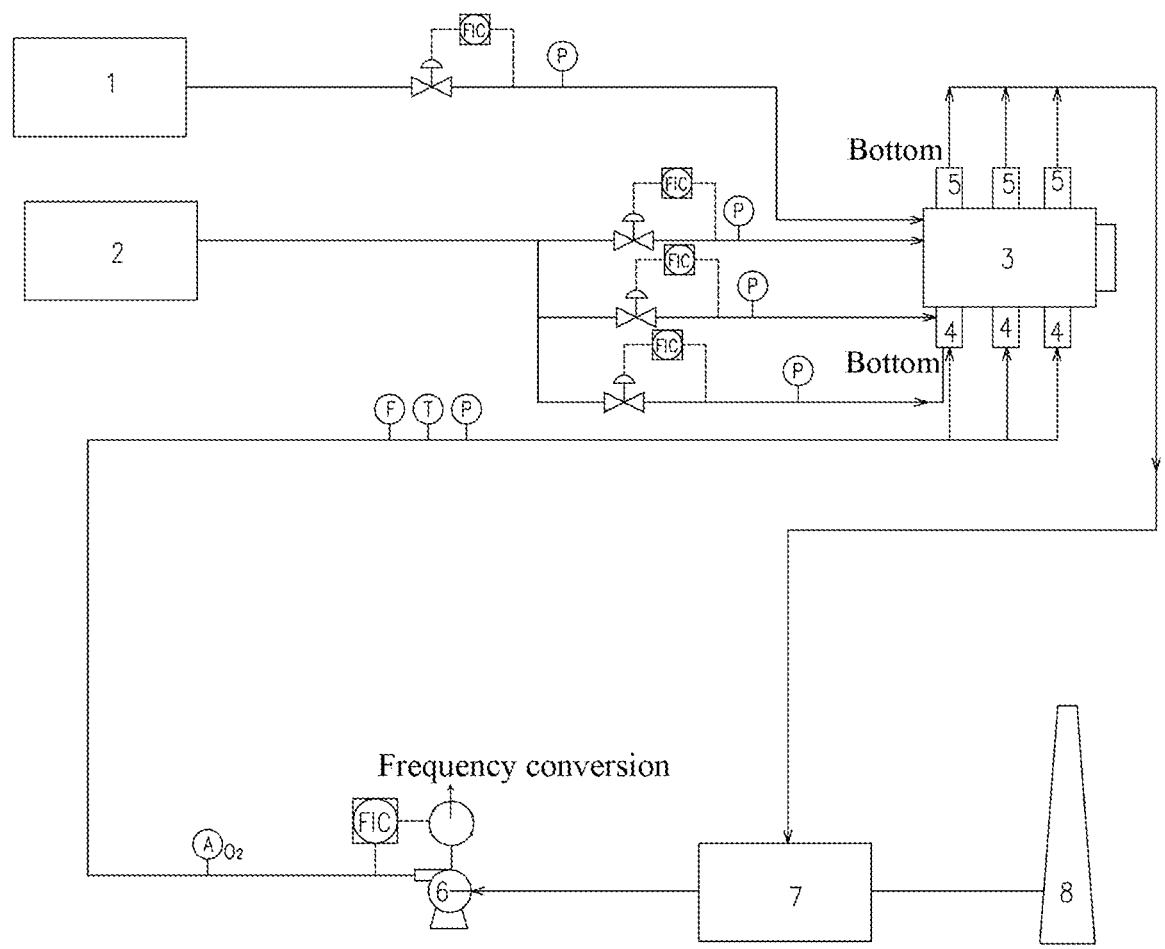
FIG. 1 is a schematic diagram of a system needed during combustion of the present disclosure (conversion and reforming reaction in non-catalytic reformers A, and temperature rise and heat storage in non-catalytic reformers B).
Figure 2:
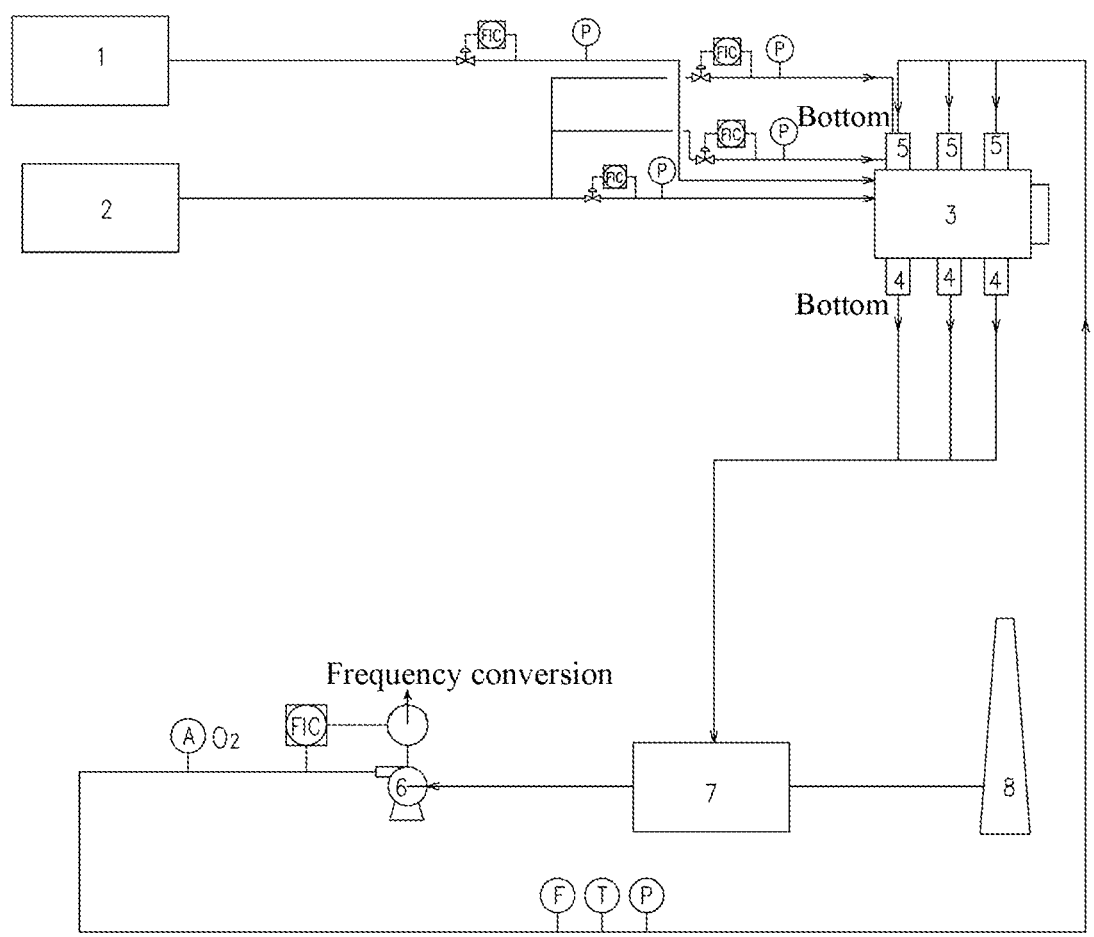
FIG. 2 is a schematic diagram of the system needed during combustion of the present disclosure (conversion and reforming reaction in the non-catalytic reformers B, and temperature rise and heat storage in the non-catalytic reformers A).

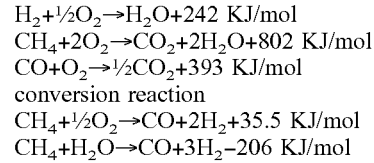
$H_2+\tfrac{1}{2}O_2 \rightarrow H_2O+242 \text{ KJ/mol}$
$CH_4+2O_2 \rightarrow CO_2+2H_2O+802 \text{ KJ/mol}$
$CO+O_2 \rightarrow \tfrac{1}{2}CO_2+393 \text{ KJ/mol}$
conversion reaction
$CH_4+\tfrac{1}{2}O_2 \rightarrow CO+2H_2+35.5 \text{ KJ/mol}$
$CH_4+H_2O \rightarrow CO+3H_2-206 \text{ KJ/mol}$
$CH_4+CO_2 \rightarrow 2CO+2H_2-247 \text{ KJ/mol}$ According to a combustion process of a glass kiln with non-catalytic reformers, a system needed during combustion, shown in FIG. 1 and FIG. 2, includes the glass kiln 3, non-catalytic reformers A4, non-catalytic reformers B5, a flue gas recovery device 7, a chimney 8, a high-temperature flue gas fan 6, a natural gas supply device 2, and an oxygen supply device 1.

For the non-catalytic reformers A4 and the non-catalytic reformers B5, one non-catalytic reformer A4 and one non-catalytic reformer B5 are coupled. Multiple pairs may be flexibly set according to a scale of the glass kiln. Three pairs are shown in FIG. 1 and FIG. 2, which enable natural gas and vapor and carbon dioxide in circulating flue gas to be subjected to conversion and reforming reaction, and meanwhile have a function of a regenerative chamber, recycling heat of the high-temperature circulating flue gas.

The flue gas recovery device 7 is used for recycling heat and removing dust and sulfur from the high-temperature circulating flue gas discharged out of the non-catalytic reformers A4/B5.

The high-temperature flue gas fan 6 is a frequency-conversion high-temperature flue gas fan and pressurizes the circulating flue gas after heat recycling and dust and sulfur removal to be led into the non-catalytic reformers A4/B5. The high-temperature flue gas fan 6 may also be an ordinary high-temperature flue gas fan with a flow regulating valve additionally arranged in an outlet.

The natural gas supply device 2 supplies natural gas.

The oxygen supply device 1 supplies oxygen. Methods for producing oxygen are selected according to glass kilns 3 of different scales, such as a cryogenic method and a pressure swing adsorption method. Purity of the oxygen is greater than or equal to 90%, and pressure is 0.05-0.2 MPa. A large glass kiln adopts the cryogenic method for oxygen production. Firstly, air is compressed and cooled and the air is liquefied. The air makes contact with a liquid on a rectifying tower plate due to different boiling points of an oxygen component and a nitrogen component for mass and heat exchange. The high-boiling-point oxygen component is constantly condensed into a liquid from the vapor. The low-boiling-point nitrogen component is constantly diverted into the vapor to constantly increase the nitrogen content in the rising vapor while the oxygen content in the downstream liquid becomes higher and higher, thereby separating the oxygen and the nitrogen to obtain oxygen with the purity of 99.6% or above. A flow regulating valve controls oxygen flow. The oxygen is delivered into the glass kiln 3 by an oxygen spray gun. Medium/small-sized glass kilns adopt the pressure swing adsorption method for oxygen production. After air is pressurized and passes through an adsorption layer of a molecular sieve adsorption tower, nitrogen molecules are preferably adsorbed while oxygen molecules stay in a gas phase to become refined oxygen. When the nitrogen component in an adsorbent is absorbed and saturated, the nitrogen molecules adsorbed to a surface of the adsorbent are desorbed by a pressure reduction or vacuum pumping method and delivered out of a scope, thereby recovering adsorption capacity of the adsorbent. Accordingly, the oxygen and the nitrogen are separated to obtain oxygen with the purity of 90-95%. The flow regulating valve controls the oxygen flow. The oxygen is delivered into the glass kiln 3 by the oxygen spray gun.

The non-catalytic reformers A4 and the non-catalytic reformers B5 are arranged on two sides of the glass kiln 3 and communicate with the glass kiln 3. The non-catalytic reformers A4 and the non-catalytic reformers B5 are in switching connection to an inlet of the flue gas recovery device 7. An outlet of the flue gas recovery device 7 is connected to the chimney 8 and the high-temperature flue gas fan 6 separately. The high-temperature flue gas fan 6 is in switching connection to bottoms of the non-catalytic reformers A4 and the non-catalytic reformers B5.

The natural gas supply device 2 is in switching connection to the bottoms of the non-catalytic reformers A4, upper portions of the non-catalytic reformers A4, the bottoms of the non-catalytic reformers B5, upper portions of the non-catalytic reformers B5 and the glass kiln 3.

The oxygen supply device 1 is connected to the glass kiln 3.

Pipelines which communicate the high-temperature flue gas fan 6 with the bottoms of the non-catalytic reformers A4 and the non-catalytic reformers B5 are each provided with an oxygen content analysis meter, a flow meter, a temperature sensor, and a pressure sensor.

Pipelines which communicate the natural gas supply device 2 with the bottoms of the non-catalytic reformers A4, the upper portions of the non-catalytic reformers A4, the bottoms of the non-catalytic reformers B5, the upper portions of the non-catalytic reformers B5, and the glass kiln 3 are each provided with a flow regulating valve and a pressure sensor. A pipeline which communicates the oxygen supply device 1 with the glass kiln 3 is provided with a flow regulating valve and a pressure sensor.

Figure 3:
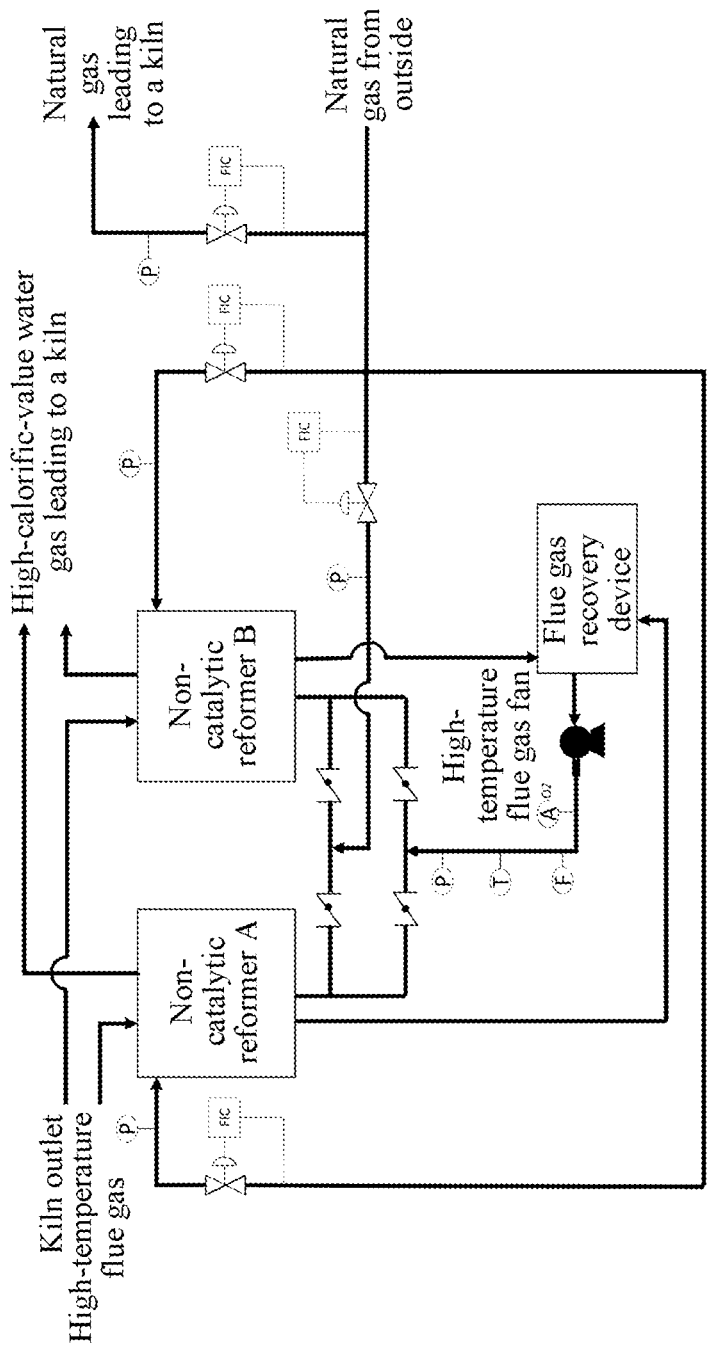
FIG. 3 is a schematic switchover diagram of the non-catalytic reformers A and the non-catalytic reformers B of the present disclosure.

Preferably, the system further includes an intelligent control system for controlling a kiln temperature and a kiln pressure of the glass kiln 3. The intelligent control system includes units for i) controlling switchover of the non-catalytic reformers A4/B5, ii) controlling switchover of inflow of the natural gas into the non-catalytic reformers A4/B5 and the glass kiln 3, where a schematic switchover diagram is shown in FIG. 3, iii) regulating flow of the oxygen into the glass kiln 3, iv) regulating flow of the circulating flue gas into the non-catalytic reformers A4/B5, and/or v) regulating flow of the natural gas into the non-catalytic reformers A4/B5 and the glass kiln 3.

Figure 4:
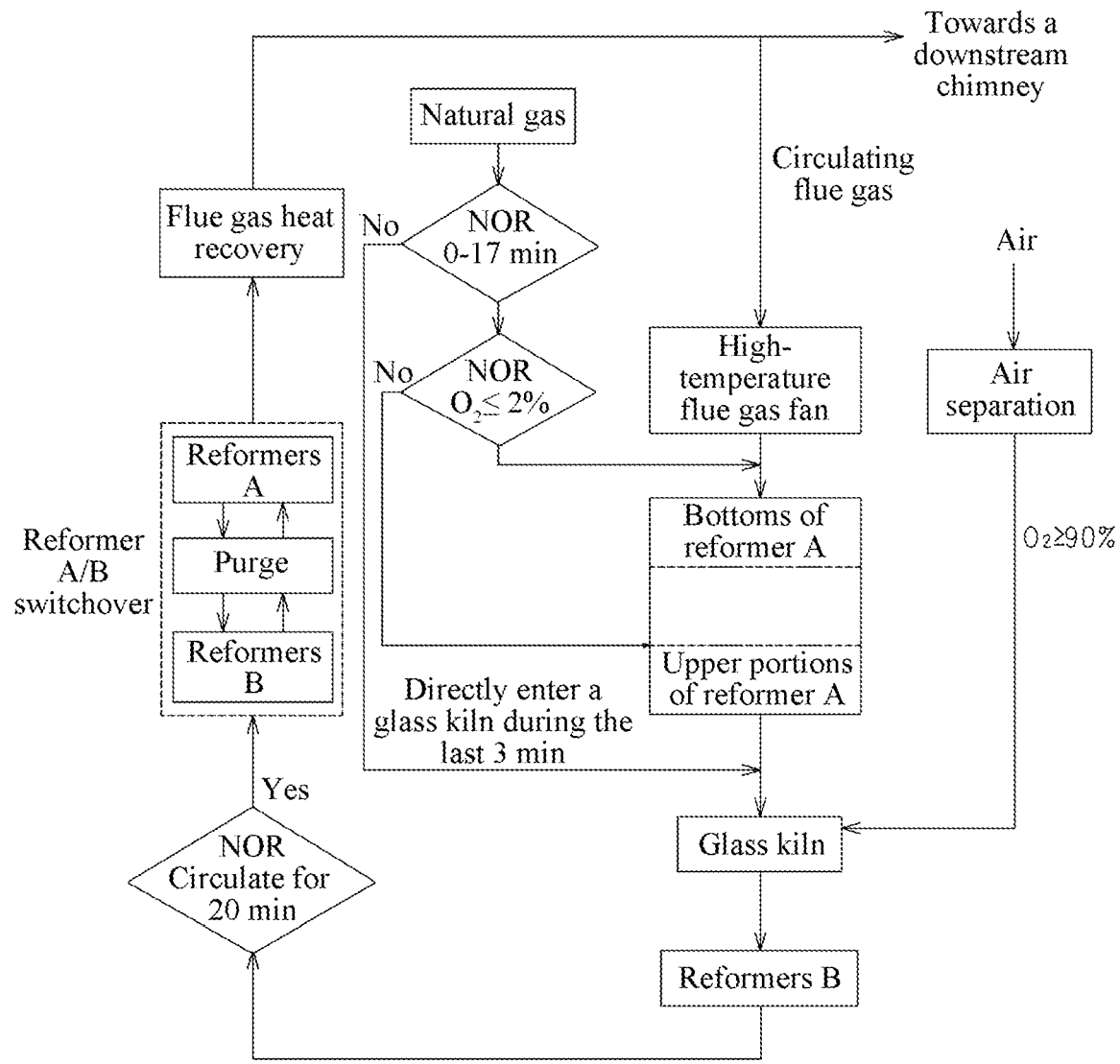
FIG. 4 is a schematic diagram of combustion logic control of the present disclosure.

As shown in FIG. 4, during combustion, the process includes following steps.

1) At an initial stage, the air is utilized for combustion supporting. The air enters the glass kiln 3 from the non-catalytic reformers A4. The natural gas directly enters the glass kiln 3. The air and the natural gas are combusted in the glass kiln 3. Flue gas generated during combustion passes through the non-catalytic reformers B5 to heat up and store heat for the non-catalytic reformers B5, then enters the flue gas recovery device 7 for heat recovery and dust and sulfur removal, then is led into the non-catalytic reformers A4 by the high-temperature flue gas fan 6 and then enters the glass kiln 3. Meanwhile, the oxygen is led into the glass kiln 3 by the oxygen spray gun. The circulating flue gas and the oxygen are mixed (carbon-based enriched oxygen) for combustion supporting, gradually replacing air combustion supporting. After a period of time, the non-catalytic reformers A4/B5 are switched to make the air enter the glass kiln 3 from the non-catalytic reformers B5. The natural gas directly enters the glass kiln 3. The air and the natural gas are combusted in the glass kiln 3. Flue gas generated during combustion passes through the non-catalytic reformers A4 to heat up and store heat for the non-catalytic reformers A4, then enters the flue gas recovery device 7 for heat recovery and dust and sulfur removal, then is led into the non-catalytic reformers B5 by the high-temperature flue gas fan 6 and then enters the glass kiln 3. Meanwhile, the oxygen is led into the glass kiln 3 by the oxygen spray gun. The circulating flue gas and the oxygen are mixed for combustion supporting, gradually replacing air combustion supporting. Switchover is cyclically performed. After a period of time of circulation, the circulating flue gas is rich in vapor and carbon dioxide, the circulating flue gas and the oxygen completely replace the air for combustion supporting, and the system enters a normal running state.

2) At a conversion and reforming stage at 0-17 min, when the oxygen content in the circulating flue gas is less than or equal to a set content limiting value of 2%, the circulating flue gas enters the non-catalytic reformers A4 from the bottoms of the reformers. The natural gas also enters the non-catalytic reformers A4 from the bottoms of the reformers. The natural gas and the vapor and the carbon dioxide in the circulating flue gas are subjected to a conversion and reforming reaction to produce hydrogen and carbon monoxide, namely high-calorific-value water gas (the conversion and reforming reaction may happen at 750° C. or above without a catalyst) delivered into the glass kiln 3. The oxygen is delivered into the glass kiln 3 by the oxygen spray gun. The oxygen, the carbon monoxide and the hydrogen produced by non-catalytic conversion, and less natural gas not subjected to the conversion and reforming reaction are subjected to a combustion reaction in the glass kiln 3. When the oxygen content in the circulating flue gas is greater than the set content limiting value of 2%, the circulating flue gas enters the non-catalytic reformers A4 from the bottoms of the reformers. The natural gas enters the non-catalytic reformers A4 from the upper portions of the reformers, namely the positions about ⅕-⅓ away from the tops of the non-catalytic reformers A4. The natural gas and the vapor and the carbon dioxide in the circulating flue gas are subjected to the conversion and reforming reaction to produce hydrogen and carbon monoxide, namely high-calorific-value water gas delivered into the glass kiln 3. The oxygen is delivered into the glass kiln 3 by the oxygen spray gun. The oxygen, the carbon monoxide and the hydrogen produced by non-catalytic conversion, and less natural gas not subjected to the conversion and reforming reaction are subjected to a combustion reaction in the glass kiln 3.

3) At a flue gas purging stage at 18-20 min, after the conversion and reforming stage ends, the natural gas is switched to directly enter the glass kiln 3. The circulating flue gas enters the non-catalytic reformers A4 from the bottoms of the reformers to purge, displace, and convert residual combustible gas to enter the glass kiln 3. The oxygen is delivered into the glass kiln 3 by the oxygen spray gun to be subjected to the combustion reaction.

4) At a reformer temperature rise stage at 0-20 min, at the conversion and reforming stage and the flue gas purging stage, high-temperature flue gas at an outlet of the glass kiln 3 enters the non-catalytic reformers B5 to achieve temperature rise and heat storage inside the reformers and then enters the flue gas recovery device 7 for heat recovery and dust and sulfur removal. Then, about 20-30% of flue gas is pressurized to 0.05-0.2 MPa by the high-temperature flue gas fan 6 to be led into the non-catalytic reformers A4 to be circulated. The rest is emptied by the chimney 8 or subjected to carbon capture, utilization, and storage (CCUS).

5) The non-catalytic reformers A/B are switched every 20 min. The non-catalytic reformers A4/B5 are switched. Namely, the non-catalytic reformers B5 are subjected to the conversion and reforming reaction. The non-catalytic reformers A4 are subjected to temperature rise and heat storage. Switchover is cyclically performed. The circulating flue gas accounts for 20-30% of the total flue gas amount.

Preferably, raw materials such as silica sand, sodium carbonate, dolomite, limestone, and mirabilite of the glass kiln 3 may be mingled with and adsorb air when entering the glass kiln 3, the circulating flue gas is utilized for performing isolating and replacing on a raw material feeding system, and generation of raw material type nitric oxide is avoided. The circulating flue gas is utilized for isolating parts of the glass kiln 3 prone to air leakage. The parts of the glass kiln 3 prone to air leakage include a glass kiln feeding port, a flame viewing port, a flue and the like. An isolation manner includes air seal, an air curtain and the like. Generation of thermal nitric oxide is avoided.

What is claimed is:

1. A combustion process of a glass kiln with non-catalytic reformers, wherein a system needed during combustion comprises the glass kiln, a non-catalytic reformer A, a non-catalytic reformer B, a flue gas recovery device, a chimney, a high-temperature flue gas fan, a natural gas supply device, and an oxygen supply device;

the non-catalytic reformer A and the non-catalytic reformer B are arranged on two sides of the glass kiln and communicate with the glass kiln; the non-catalytic reformer A and the non-catalytic reformer B are in switching connection to an inlet of the flue gas recovery device, an outlet of the flue gas recovery device is connected to the chimney and the high-temperature flue gas fan separately, and the high-temperature flue gas fan is in switching connection to bottoms of the non-catalytic reformer A and the non-catalytic reformer B;

the natural gas supply device is in switching connection to the bottom of the non-catalytic reformer A, an upper portion of the non-catalytic reformer A, the bottom of the non-catalytic reformer B, an upper portion of the non-catalytic reformer B and the glass kiln, and the oxygen supply device is connected to the glass kiln;

pipelines which communicate the high-temperature flue gas fan with the bottoms of the non-catalytic reformer A and the non-catalytic reformer B are each provided with an oxygen content analysis meter, a flow meter, a temperature sensor, and a pressure sensor, pipelines which communicate the natural gas supply device with the bottom of the non-catalytic reformer A, the upper portion of the non-catalytic reformer A, the bottom of the non-catalytic reformer B, the upper portion of the non-catalytic reformer B, and the glass kiln are each provided with a flow regulating valve and a pressure sensor, and a pipeline which communicates the oxygen supply device with the glass kiln is provided with a flow regulating valve and a pressure sensor;

during combustion, the process comprises the following steps:

1) at an initial stage, utilizing air for combustion supporting; after flue gas is generated, mixing circulating flue gas and oxygen to serve as a combustion improver to gradually replace the air for combustion supporting; and after a period of time of circulation, the circulating flue gas being rich in vapor and carbon dioxide, completely replacing the air with the circulating flue gas and the oxygen for combustion supporting, and enabling the system to enter a normal running state;

2) At a conversion and reforming stage: when the oxygen content in the circulating flue gas is less than or equal to a set content limiting value, enabling the circulating flue gas to enter the non-catalytic reformer A from the bottom of the reformer, enabling natural gas to also enter the non-catalytic reformer A from the bottom of the reformer, enabling the natural gas and the vapor and the carbon dioxide in the circulating flue gas to be subjected to a conversion and reforming reaction to produce hydrogen and carbon monoxide, namely high-calorific-value water gas, delivering the high-calorific-value water gas into the glass kiln, delivering the oxygen into the glass kiln, and enabling the oxygen, the carbon monoxide and the hydrogen produced by non-catalytic conversion, and less natural gas not subjected to the conversion and reforming reaction to be subjected to a combustion reaction in the glass kiln; and when the oxygen content in the circulating flue gas is greater than the set content limiting value, enabling the circulating flue gas to enter the non-catalytic reformer A from the bottom of the reformer, enabling the natural gas to enter the non-catalytic reformer A from the upper portion of the reformer, enabling the natural gas and the vapor and the carbon dioxide in the circulating flue gas to be subjected to the conversion and reforming reaction to produce hydrogen and carbon monoxide, namely high-calorific-value water gas, delivering the high-calorific-value water gas into the glass kiln, delivering the oxygen into the glass kiln, and enabling the oxygen, the carbon monoxide and the hydrogen produced by non-catalytic conversion, and less natural gas not subjected to the conversion and reforming reaction to be subjected to a combustion reaction in the glass kiln;

3) At a flue gas purging stage: after the conversion and reforming stage ends, switching the natural gas to directly enter the glass kiln, enabling the circulating flue gas to enter the non-catalytic reformer A from the bottom of the reformer to purge, displace, and convert residual combustible gas to enter the glass kiln, and delivering the oxygen into the glass kiln to be subjected to the combustion reaction;

4) At a reformer temperature rise stage: at the conversion and reforming stage and the flue gas purging stage, enabling high-temperature flue gas at an outlet of the glass kiln to enter the non-catalytic reformer B to achieve temperature rise and heat storage inside the reformer and then enter the flue gas recovery device for heat recovery and dust and sulfur removal, then pressurizing part of the flue gas by the high-temperature flue gas fan to be led into the non-catalytic reformer A to be circulated, and emptying the rest by the chimney or enabling the rest to be subjected to carbon capture, utilization, and storage (CCUS); and 5) After a period of time, switching the non-catalytic reformers A/B, namely, enabling the non-catalytic reformer B to be subjected to the conversion and reforming reaction, achieving temperature rise and heat storage in the non-catalytic reformer A; and cyclically performing switchover.

2. The combustion process of a glass kiln with non-catalytic reformers according to claim 1, wherein the oxygen supply device produces oxygen with greater than or equal to 90% purity and a pressure of 0.05-0.2 MPa, wherein the oxygen is produced through a method comprising a cryogenic method or a pressure swing adsorption method.

3. The combustion process of a glass kiln with non-catalytic reformers according to claim 1, wherein in step 1): at the initial stage, the air is utilized for combustion supporting, the air enters the glass kiln from the non-catalytic reformer A, the natural gas directly enters the glass kiln, the air and the natural gas are combusted in the glass kiln, flue gas generated during combustion passes through the non-catalytic reformer B to heat up and store heat for the non-catalytic reformer B, then enters the flue gas recovery device for heat recovery and dust and sulfur removal, then is led into the non-catalytic reformer A by the high-temperature flue gas fan and then enters the glass kiln, meanwhile, the oxygen is led into the glass kiln, and the circulating flue gas and the oxygen are mixed for combustion supporting, gradually replacing air combustion supporting; after a period of time, the non-catalytic reformers A/B are switched to make the air enter the glass kiln from the non-catalytic reformer B, the natural gas directly enters the glass kiln, the air and the natural gas are combusted in the glass kiln, flue gas generated during combustion passes through the non-catalytic reformer A to heat up and store heat for the non-catalytic reformer A, then enters the flue gas recovery device for heat recovery and dust and sulfur removal, then is led into the non-catalytic reformer B by the high-temperature flue gas fan and then enters the glass kiln, meanwhile, the oxygen is led into the glass kiln, and the circulating flue gas and the oxygen are mixed for combustion supporting, gradually replacing air combustion supporting; switchover is cyclically performed; and after a period of time of circulation, the circulating flue gas is rich in vapor and carbon dioxide, the circulating flue gas and the oxygen completely replace the air for combustion supporting, and the system enters a normal running state.

4. The combustion process of a glass kiln with non-catalytic reformers according to claim 1, wherein in steps 2)-5), the non-catalytic reformers A/B are switched every 20 min, the conversion and reforming stage occurs at 0-17 min, the flue gas purging stage occurs at 18-20 min, and the reformer temperature rise stage occurs at 0-20 min.

5. The combustion process of a glass kiln with non-catalytic reformers according to claim 1, wherein in step 2), a content limiting value of the oxygen in the circulating flue gas is set to be 2%.

6. The combustion process of a glass kiln with non-catalytic reformers according to claim 1, wherein in step 2), when the oxygen content in the circulating flue gas is greater than the set content limiting value, the natural gas enters the non-catalytic reformer A from the upper portion of the reformer, namely, $\frac{1}{5}$-$\frac{1}{3}$ away from the top of the non-catalytic reformer A.

7. The combustion process of a glass kiln with non-catalytic reformers according to claim 1, wherein in step 2), step 3) and step 5), the oxygen is delivered into the glass kiln by an oxygen spray gun.

8. The combustion process of a glass kiln with non-catalytic reformers according to claim 1, wherein in step 4), the circulating flue gas generated after heat recovery and dust and sulfur removal is pressurized to 0.05-0.2 MPa by the high-temperature flue gas fan and then is led into the non-catalytic reformer A to be circulated.

9. The combustion process of a glass kiln with non-catalytic reformers according to claim 1, wherein the system needed during combustion further comprises an intelligent control system for controlling a kiln temperature and a kiln pressure of the glass kiln, the intelligent control system comprising units for i) controlling switchover of the non-catalytic reformers A/B, ii) controlling switchover of inflow of the natural gas into the non-catalytic reformers A/B and the glass kiln, iii) regulating flow of the oxygen into the glass kiln, regulating, iv) regulating flow of the circulating flue gas into the non-catalytic reformers A/B, and/or v) regulating flow of the natural gas into the non-catalytic reformers A/B and the glass kiln.

\* \* \* \* \*